United States Patent [19]

Browne

[11] Patent Number: 4,997,573

[45] Date of Patent: Mar. 5, 1991

[54] CLARIFICATION PROCESS FOR MINING LIQUORS

[75] Inventor: Geoffrey R. Browne, Wooroloo, Australia

[73] Assignee: Golconda Engineering and Mining Services Pty. Ltd., Midland, Australia

[21] Appl. No.: 473,117

[22] Filed: Jan. 31, 1990

Related U.S. Application Data

[63] Continuation of Ser. No. 233,151, Aug. 17, 1988, abandoned.

[30] Foreign Application Priority Data

Aug. 17, 1987 [AU] Australia .................................. PI3780
Mar. 18, 1988 [AU] Australia .................................. PI7336
Jun. 30, 1988 [AU] Australia .................................. PI9143

[51] Int. Cl.$^5$ ............................................... C02F 1/56
[52] U.S. Cl. ........................................ 210/714; 210/725; 210/727
[58] Field of Search ............... 210/714, 709, 723-728, 210/738

[56] References Cited

U.S. PATENT DOCUMENTS

| | | | |
|---|---|---|---|
| 3,142,638 | 7/1964 | Blaisdell et al. | 210/714 X |
| 3,350,302 | 10/1967 | Demeter et al. | 210/45 |
| 3,680,698 | 8/1972 | Liu et al. | 210/714 X |
| 3,932,275 | 1/1976 | Mewes et al. | 210/714 X |
| 4,265,770 | 5/1981 | Thomas | 210/715 |
| 4,465,597 | 8/1984 | Herman et al. | 210/714 X |

FOREIGN PATENT DOCUMENTS

| | | |
|---|---|---|
| 69604/74 | 12/1975 | Australia . |
| 5814910 | 7/1981 | Japan . |
| 2003127 | 3/1979 | United Kingdom . |
| 1583881 | 2/1981 | United Kingdom . |

OTHER PUBLICATIONS

Abstract No. Su 1009-491-A, Chemical Engineering, p. 7.

The article "Dewatering Florida Phosphate Waste Clays", from the publication entitled , Find Particle Processing by Oxford, T. P., and Bromwell, L. G. (AIME 1980).

Primary Examiner—Tom Wyse
Attorney, Agent, or Firm—Merchant, Gould, Smith, Edell, Welter & Schmidt

[57] ABSTRACT

A process for clarifying liquors containing suspended solids is disclosed. The process is applicable to liquors having concentrations of suspended solids ranging from low to high, typically between 0.5 and 40 gm/l. The clarification process is characterized by the addition of flocculent and in excess of 50 gm/l inert particulate material so as to cause the formation of flocs comprising suspended solids and inert particulate material thereby to separate the suspended solids from the liquor. The inert particulate material is selected from silica sand, magnetite, limestone, ilmenite, hematite and calcite.

10 Claims, 1 Drawing Sheet

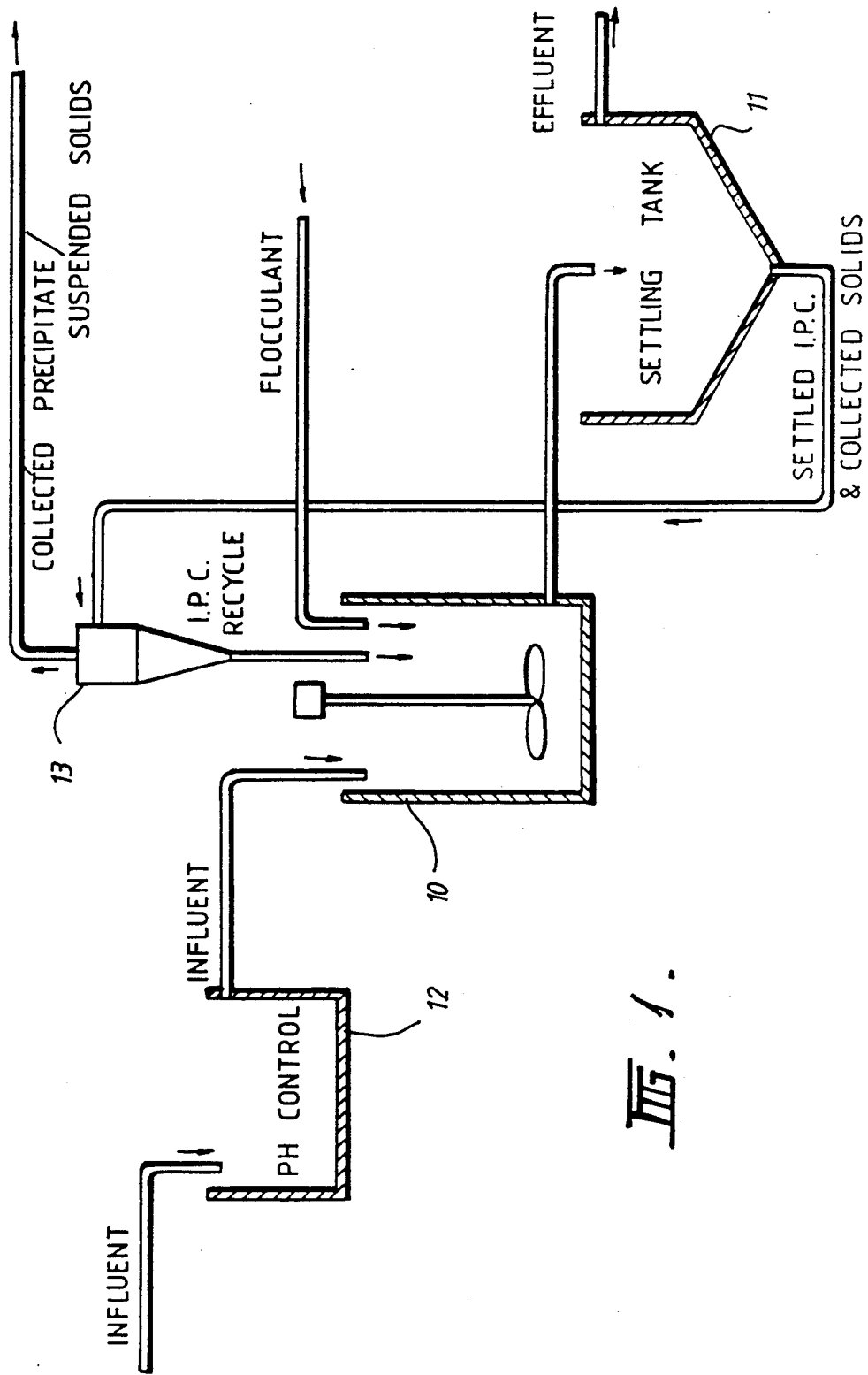

CLARIFICATION PROCESS FOR MINING LIQUORS

This is a continuation of application Ser. No. 07/233,151, filed Aug. 17, 1988, now abandoned.

This invention relates to a process for clarifying liquors containing suspended solids.

Such liquors are produced throughout the mining industry and in some instances present substantial difficulties with respect to handling and disposal. In this regard, the liquors comprise both aqueous and non-aqueous liquids having concentrations of suspended solids up to 40 ml/l or more.

The following brief discussion concerns the clarification problems encountered with three specific liquors and is intended to illustrate the extent to which difficulties clarifying liquors are wide spread throughout the mining industry.

The first example relates to the gold mining industry. In this regard, the removal of gold from ore by leaching with cyanide produces tailings suspended in liquor. In the normal course of events, in order to properly dispose of the liquor it is necessary to separate the tailings from the liquor and then to treat the liquor to remove any cyanide in solution. In the course of this treatment the formation of copper cyanide and other metal cyanide precipitates is common. Typically, the concentration of the tailings is in the order of 0.5 gm/l. In many instances, conventional settling techniques, such as the use of flocculents, are not satisfactory, and a proportion of the precipitates remain suspended in the liquor and adversely affect the efficiency of the subsequent treatment of the liquor to remove dissolved cyanide. Furthermore, usually, the treated substantially cyanide-free liquor is transferred to a settling pond or tank and left to stand to allow the remaining portion of the precipitates to settle from the liquor before the liquor is released to the environment. However, in many instances, the precipitates are slow settling, even in situations where flocculents are added, and as a consequence mining companies are forced to maintain relatively large settling ponds or tanks in order to contain the volume of liquor.

The second example relates to the Bayer Process for the extraction and refining of alumina via a digestion process utilizing caustic soda solution. This process dissolves alumina from bauxite ore and following liquor clarification the alumina is recrystallised as alumina trihydrate.

During the digestion process certain organic materials present in the ore are also dissolved, and subsequently all or part of these organics are converted to sodium oxalate. Unless the concentration of sodium oxalate converted in the process liquor stream is controlled below a certain critical level, the oxalate tends to co-precipitate with the alumina causing substantial deterioration in product quality.

In order to reduce the concentration of sodium oxalate, in certain forms of the Bayer process sodium oxalate is itself removed from the liquor stream by crystallisation in a side stream followed by subsequent liquid-solid separation steps. The sodium oxalate is disposed of while the purified liquor side-stream is returned to the main process flow, thus diluting the overall concentration of sodium oxalate in the main process stream. Typically, the concentration of sodium oxalate in the side stream is in the order of 18 to 22 gm/l.

An essential feature of the side stream process for the removal of sodium oxalate is the liquid-solid separation step in which sodium oxalate crystals are removed from suspension. Whilst the preferred method of clarification is to use a settling tank or thickener, often the overflow clarities achieved in these devices are unsatisfactory resulting in the need for subsequent down stream filtration stages. Good clarities of the returning side stream are essential to prevent solid sodium oxalate re-dissolving in the main process stream.

Conventional settling techniques are largely inadequate. For example, whilst flocculents, such as polyelectrolytes, can form sodium oxalate flocs, these tend to from semi-stable networks which are very slow settling and, in the presence of entrained air will even float to the thickening tank overflow. Moreover, the slow settling characteristic of such flocs is due also to the viscous nature of the suspension.

The third example relates to the recovery of mineral sands from swaps by dredging the bottom of the swaps and separating the mineral sands from the other solids and liquors removed by the dredge. The unwanted solids and liquor form a black slime, and typically the concentration of solids in the slime is in the order of 36 gm/l. Conventional settling techniques are totally inadequate, and usually the slime is transferred to large settling ponds and left.

An object of the present invention is to provide a clarification process which alleviates the problems described in the preceding paragraphs.

According to the present invention there is provided a process for clarifying a liquor containing suspended solids, the process comprising adding a flocculent and in excess of 50 gm/l inert particulate material, either simultaneously or at separate times, to the liquor so as to cause suspended solids to separate from the liquor with the flocculent and inert particulate material.

The clarification process is based on the realisation that the use of in excess of 50 gm/l inert particulate material, in combination with flocculent, unexpectedly results in the removal of substantially all of the suspended solids in a liquor at relatively high clarification rates.

The clarification process has been found to be equally effective in clarifying liquors having low concentrations of suspended solids and liquors having high concentrations of suspended solids. Typically, low concentrations, in the order of 0.5 to 3 gm/l, of suspended solids are found in liquors containing tailings produced in the removal of gold from ore and in rivers and the like waterways. Typically, high concentrations, in the order of 36 to 40 gm/l, are found in slimes produced in the dredging of mineral sands from swamps.

The clarification process has been found to be equally effective in clarifying a wide range of different solids, such ferric and other metal hydroxides, copper cyanide, metal cyanoferrates copper thiocyanate, insoluble calcium salts and sodium oxalate.

The term "inert" as described herein in connection with "particulate material" is understood to mean that the particulate material is not substantially attacked by the liquor. In other words, the particulate material exhibits both suitable chemical and physical stability in the liquor.

The term "liquor" is understood herein to include aqueous and non-aqueous liquids.

It is preferred that in excess of 70 gm/l inert particulate material is added to the liquor. Typically, in excess of 100 gm/l inert particulate material is added to the liquor.

It is preferred that the process further comprises agitating the liquor after the addition of flocculent and inert particulate material to cause the formation of flocs comprising inert particulate material and suspended solids.

With such an arrangement it is also preferred that the process further comprises transferring the liquor and the flocs to a settling tank to allow the flocs to separate from the liquor.

In a preferred arrangement the process further comprises, separating the liquid and the precipitate comprising flocculent, inert particulate material and suspended solids, and agitating the precipitate to break up the flocs. The inert particulate material and the suspended solids are then separated by conventional classification techniques. With such an arrangement it is possible to recover and to re-use the inert particulate material.

It is preferred that the insert particulate material is added to the liquor before the flocculent.

In an alternative arrangement it is preferred that the inert particulate material is added to the liquor after the flocculent.

It is preferred that the concentration of suspended solids in the liquor is in the range of 0.5 to 40.0 gm/l.

It is preferred that the inert particulate material has a negative zeta potential. In this regard, it is preferred that the process further comprises modifying the pH of the liquor so that the inert particulate material has a negative zeta potential.

The size distribution of the inert particulate material needs to be such that it is not so coarse that it does not take in the flocculation process, nor not so small that it is lost in subsequent classification to separate the inert particulate material from the suspended solids.

There are no particular requirements concerning the shape of the inert particulate material.

With regard to the size of the inert particulate material, it is preferred that the longest dimension is in the range of 10 to 300 microns. It is also preferred that the specific surface of the inert particulate material is in the range of 100 to 500 $cm^2/gm$.

It is preferred that the inert particulate material is selected from silica sand, alumina, magnetite, limestone, hematite, ilmenite and calcite. It is noted that any other suitable inert particulate material may be used.

Further description of the invention is now provided with reference to the accompanying drawing which is a flow chart of a preferred embodiment of the clarification process in accordance with the invention.

The process shown in the FIGURE is adapted to clarify an influent stream containing suspended solids.

The influent stream may comprise liquor containing metal cyanide precipitate produced in a process for recovering or regenerating cyanide from gold leach tailings liquor or liquor containing sodium oxalate produced in the Bayer Process or any other liquor containing suspended solids. The influent stream may also comprise any other liquor containing suspended solids.

With reference to the FIGURE, the influent stream is transferred to a conditioning tank 10, optionally via a pH control tank 12, and is dosed with appropriate concentrations of inert particulate material and flocculent. The flocculent may be any suitable known flocculent, such as a polyelectrolyte.

The influent stream is then agitated in the conditioning tank 10 to cause the formation of flocs which entrain inert particulate material and suspended solids.

The influent stream is then transferred to a settling tank 11 in which the flocs settle rapidly.

The clarified effluent from the settling tank 11 may be transferred to a second circuit of the conditioning tank 10 and settling tank 11 for further clarification. Alternatively, the clarified effluent may be transferred to a final filtration stage. In the case of liquor containing metal cyanide precipitates produced in a process for recovering or regenerating cyanide from gold leach tailings liquor, the filtered clarified effluent may be subsequently transferred for treatment to remove any cyanide in solution in the effluent. In the case of liquor containing sodium oxalate the filtered clarified effluent may be subsequently returned to the main Bayer Process stream.

The settled flocs in the settling tank 11 are transferred by a hydrocyclone 13 or other suitable attritioning device to separate the inert particulate material and the suspended solids. The underflow from the hydrocyclone 13, which comprises inert particulate material and a small quantity of entrained suspended solids, is recycled to the conditioning tank 10. The overflow from the hydrocyclone 13, which comprises the remainder of the suspended solids and retained liquor, is transferred to a settling pond (not shown) or other suitable clarifying device for recovery of suspended solids or liquor, if required. Alternatively, the overflow from the hydrocyclone 13 is transferred directly for disposal.

The effectiveness of the clarification process is illustrated hereinunder by reference to the following examples.

EXAMPLE 1

A series of experiments were carried out on liquor containing metal cyanide precipitates produced in a process for recovering or regenerating cyanide from gold leach tailings to investigate the effect of the concentration of inert particulate material on the clarification process.

The samples of liquor were at pH 2.7 and contained 0.5 gm/l suspended tailings. An amount of flocculent equivalent to 20 $gm/m^3$ and different amounts of silica sand were added to each of six samples. The samples were agitated to cause the formation of flocs, and the clarity of the samples was measured after 1, 5 and 15 minutes.

The results of the experiments are set out in Table 1.

TABLE 1

| Sample | Sand | Supernatent Clarity (NTU)* | | |
|---|---|---|---|---|
| | | 1 minute | 5 minutes | 15 minutes |
| 1 | 2 | 48 | 25 | 12 |
| 2 | 4 | 39 | 24 | 10 |
| 3 | 10 | 25 | 13 | 4 |
| 4 | 50 | 3 | 2 | 1 |
| 5 | 100 | 1 | 0 | 0 |
| 6 | 160 | 1 | 1 | 1 |

*NTU - Nepholmetric Transmission Unit

The results presented in Table 1 indicate that the addition of 50 gm/l and more inert particulate material substantially clarified the liquor after 1 minute, and that such clarities were not achieved with the addition of lower concentrations of inert particulate material after 15 minutes.

EXAMPLE 2

A series of experiments were carried out on liquor containing sodium oxalate to investigate the effectiveness of the clarification process.

Samples of liquor containing 18-20 gm/liter solid sodium oxalate were dosed with 10% by volume of inert particulate material (limestone and a magnetite) floccultated with a typical polyelectrolyte flocculent and settled against a control sample to which only polyelectrolyte flocculent had been added at the same rate as the samples dosed with the inert particulate material. The settling tests were carried out in raked, 1 liter cylinders in a thermally controlled cabinet at 60° C.±10° C. Subsidence levels were recorded over a period of 35 minutes. The results of the experiments are set out in Table 2.

TABLE 2

|  | Control | Limestone | Magnetite |
|---|---|---|---|
| Initial settling rate m/hr | 0.06 | 8.0 | 8.0 |
| Interface height @ 35 mins % | 85 | 24 | 29 |
| Supernatant clarity gm/liter solid oxalate | 0.19 | 0.01 | 0.01 |

The results presented in Table 2 show clearly that, in the presence of a polyelectrolyte flocculent, the addition of limestone or magnetite results in superior clarification performance of the suspension.

This is evidenced by a significant increase in initial settling rate and a marked reduction in the concentration of residual suspended oxalate in the supernatant.

EXAMPLE 3

Measurements were made of the zeta potential of inert particulate material (silica sand) in a liquor containing metal cyanide precipitates produced in a process for recovering or regenerating cyanide from gold leach tailings. The experimental work, including the measurements, were carried out separately by consultants at Murdoch University and at Curtin University, both in Western Australia. In both instances the measurements indicated that the inert particulate material was negatively changed.

EXAMPLE 4

A series of experiments were carried out on samples of slimes obtained from the AMC mineral sands mining operation of Florida, U.S.A..

The samples were received from AMC with a collection of chemical reagents and suggestions for their use in clarifying the suspension. The suggested procedure was followed. However there was no apparent effect observed on the samples. The slime remained as murky as it was in the untreated state.

Preliminary tests using the clarification process were conducted on a qualitative scale and early indications were that some clarification was achievable, particularly if the sample was diluted.

Subsequent work indicated the following treatment procedure as most effective:
(a) pH modification using small quantity off sulphuric acid, and
(b) use of a nonionic flocculent at unusually high rates equivalent to about 0.0013 gm flocculent/gm solids (0.06 gm/liter of pond water).

A series of samples was made up, ranging from neat pond water through to 30% pond water and 70% Perth tap water. These were treated using the above method with flocculent dosage based on the actual amount of pond water used. The initial settling rate was measured over Table 3.

TABLE 3

| % Pond Water | 10 min Settling Rate m/hr |
|---|---|
| 100 | 0.30 |
| 70 | 0.54 |
| 50 | 0.66 |
| 30 | 0.66 |

The reduction in settling rate of the 30% mixture is a consequence of the solids reaching compaction prior to the expiry of the 10 minute test period. The extrapolated rate is 0.76 m/hr.

Without addition of inert particulate material, the 10 minute settling rate for 100% pond water was 0.06 m/hr.

Supernatant clarity was good in each case, the water appearing pale yellow in colour and quite clear.

It should be noted that the need for pH modification of the samples reflected that the inert particulate material has a negative zeta potential. In this regard, the samples, as received, were pH 4 and the initial results with these samples and with samples having a higher pH were relatively poor. However, the relatively good results reported above were obtained by reducing the pH of the samples to pH 2 and pH 3.

Many modifications may be made to the preferred embodiment described above without departing from the spirit and scope of the invention.

In this regard, it can readily be appreciated that it is within the scope of the invention to add coagulants such as aluminum and ferric ions to promote flocculation.

I claim:

1. A process for substantially clarifying a mining liquor containing inorganic suspended solids in concentrations ranging from about 0.5 gm/l to 40.0 gm/l comprising, adding to the liquor a polyelectrolyte flocculent and adding at least 20 parts of an inert particulate material for each of suspended solids, said material selected from the group consisting of sand, alumina, magnetite, hematite, ilmenite and calcite so as to substantially clarify the liquor by causing the suspended solids to separate from the liquor with the flocculent and inert particulate material.

2. The process defined in claim 1 comprising adding in excess of 70 gm/l inert particulate material.

3. The process defined in claim 2 comprising adding in excess of 100 gm/l inert particulate material.

4. The process defined in claim 1 comprising agitating the liquor after addition of flocculent and inert particulate material to cause the formation of flocs comprising inert particulate material and suspended solids.

5. The process defined in claim 4 comprising transferring the liquor and flocs to a settling tank to allow the flocs to separate from the liquor.

6. The process defined in claim 1 comprising adding inert particulate material to the liquor before the flocculent.

7. The process defined claim 1 comprising adding inert particulate material to the liquor after the flocculent.

8. The process defined in claim 1 comprising controlling the pH of the liquor so that the inert particulate material is negatively charged.

9. The process defined in claim 1 wherein the concentration of suspended solids in the liquor is in the range 0.5 to 10 gm/l.

10. The process defined in claim 1 wherein the concentration of suspended solids in the liquor is in the range 10 to 40 gm/l.

* * * * *

UNITED STATES PATENT AND TRADEMARK OFFICE
CERTIFICATE OF CORRECTION

PATENT NO. : 4,997,573

DATED : March 5, 1991

INVENTOR(S) : Geoffrey R. Browne

It is certified that error appears in the above-identified patent and that said Letters Patent is hereby corrected as shown below:

In Column 6, line 2, insert --the first ten minutes and the results are set out in-- after the word "over".

In Column 6, line 38, insert --part-- after the word "each".

Signed and Sealed this

Fifteenth Day of September, 1992

Attest:

DOUGLAS B. COMER

*Attesting Officer*      *Acting Commissioner of Patents and Trademarks*